US009805363B1

(12) United States Patent
Rudnick et al.

(10) Patent No.: US 9,805,363 B1
(45) Date of Patent: Oct. 31, 2017

(54) SYSTEM AND METHOD FOR ACCELERATING ACCOUNT CREATION

(71) Applicant: Delivery Agent, Inc., Denver, CO (US)

(72) Inventors: David M. Rudnick, Denver, CO (US); Christopher A. Lee, Denver, CO (US); Jared R. Wolf, Lakewood, CO (US); Wei Hu, Englewood, CO (US)

(73) Assignee: DA IP CORP., Burlingame, CA (US)

( * ) Notice: Subject to any disclaimer, the term of this patent is extended or adjusted under 35 U.S.C. 154(b) by 0 days.

(21) Appl. No.: 14/018,352

(22) Filed: Sep. 4, 2013

Related U.S. Application Data (60) Provisional application No. 61/696,783, filed on Sep. 4, 2012.

(51) Int. Cl.
*G06Q 20/36* (2012.01)
*G06Q 20/38* (2012.01)
*G06Q 20/40* (2012.01)

(52) U.S. Cl.
CPC ......... *G06Q 20/36* (2013.01); *G06Q 20/3821* (2013.01); *G06Q 20/4012* (2013.01)

(58) Field of Classification Search
USPC .......................................................... 705/76
See application file for complete search history.

(56) References Cited

U.S. PATENT DOCUMENTS

| 7,953,671 B2* | 5/2011 | Bishop et al. ................... 705/67 |
| 2007/0107016 A1* | 5/2007 | Angel et al. ...................... 725/61 |
| 2010/0042475 A1* | 2/2010 | Salzinger et al. .............. 705/10 |
| 2012/0239529 A1* | 9/2012 | Low et al. ................. 705/26.41 |
| 2013/0060851 A1* | 3/2013 | Davis .................. G06Q 20/383 709/204 |
| 2013/0159154 A1* | 6/2013 | Purves ................... G06Q 20/36 705/35 |

* cited by examiner

*Primary Examiner* — John Hayes
*Assistant Examiner* — Jason Fenstermacher
(74) *Attorney, Agent, or Firm* — Christopher P. Whitham; Cochran Freund & Young LLC (57) ABSTRACT

Leveraging the wealth of information available on-line to accelerate and facilitate commercial transactions initiated by viewers of television programming, both during conventional programming and while using interactive features such as shopping channels, application channels, executing downloaded applications, and the like, for reducing the amount and frequency of user input required by accelerating and simplifying the process of accessing stored profiles and payment methods in these transactions, and by reducing user efforts in maintaining their on-line presence without compromising user security, is described. The motivation for such simplification derives from concerns apparent in emerging t-commerce transactions, where the means by which viewers may engage in two-way transactions directly in the context of the television programming are different and frequently more constrained than in traditional e-commerce and m-commerce modes.

11 Claims, 5 Drawing Sheets

SYSTEM AND METHOD FOR ACCELERATING ACCOUNT CREATION

CROSS-REFERENCE TO RELATED APPLICATIONS

The present application claims the benefit of U.S. Provisional Patent Application No. 61/696,783 for "System And Method For Accelerating Account Creation" filed on Sep. 4, 2012, the entire contents of which application is hereby specifically incorporated by reference herein for all that it discloses and teaches.

FIELD OF THE INVENTION

Embodiments of the present invention are directed generally toward the domain of secure commercial transactions initiated in the context of television programming and carried out over the convergent global network comprising the Internet, specifically as extended to include cellular networks and the several private television delivery systems including cable, satellite, and IP television, or over another network suitable for both delivering video programming and carrying TCP/IP communications, or during playback of such recorded programming on a device connected to a TCP/IP network. Embodiments of the invention are directed specifically towards enabling and accelerating commercial transactions including, but not limited to, registering user profiles, registering payment methods, and completing purchases, by means of creating, storing, sharing, and mining user profile information to minimize requirements to enter alphanumeric characters to complete a purchase and more generally to minimize the number of characters that are entered to complete purchases.

BACKGROUND OF THE INVENTION

The term e-commerce or electronic commerce typically refers to transactions initiated and completed from a computer device connected to the Internet. The related terms m-commerce, meaning transactions initiated from a mobile telephonic device such as a smartphone, and t-commerce, meaning transactions initiated via television, are gaining currency. As in other networking technologies, the concepts of e-commerce, m-commerce, and t-commerce are convergent and the differences among the three are indistinct and variable except with reference to the type of device from which the transaction is initiated. Specifically, the Internet is involved in most t-commerce transactions, and the cellular cloud may be also.

To input credit card or other form of payment information to complete an electronic purchase can be cumbersome even on a fully-input-enabled device such as a personal computer. To validate the card information, one must supply the name as it appears on the card, the full billing address, the card number, the expiration date, and a security code from the reverse of the card. Many smaller e-commerce sites require that this input be re-entered for each new transaction to avoid the potential liability they would incur if they stored it persistently and the site security were subsequently compromised.

Large e-commerce sites such as AMAZON.COM permit regular users to create accounts and persistently store not one but several payment methods on the site. Doing this allows site customers to manage their purchases more flexibly and quickly. Customers access this stored information only after logging in via TLS (transport layer security) to a PKI (public key infrastructure) certified account, so the probability of a customer's account being hacked is reduced unless the customer uses a weak and obvious password. Most high-end e-commerce sites now police against this practice as well. Storing payment method information with many e-commerce sites has certain disadvantages to the consumer, which include a proliferation of accounts and difficult passwords to remember, or, if the consumer uses the same password for multiple accounts, a heightened security risk.

In the modern arena of multiple electronic media many holders of user account information now expose Application Program Interfaces (APIs) by means of which other online applications may, with user permission, access and share user profile information. An example of this is an on-line magazine, which allows users wishing to post comments on magazine articles to log in via FACEBOOK (a separate source of authentication and profile data). The poster provides only his email and password to authenticate his FACEBOOK account. The magazine then displays the authenticated comment with the poster's name, locale, and professional title (presuming that the user has not previously restricted access to those data via his FACEBOOK profile). FACEBOOK, in turn, publishes the comment to the poster's FACEBOOK community. Both applications, the magazine and FACEBOOK, benefit from enriched content. The poster benefits by not having had to create and maintain a separate profile with a separate username and password in order to post on a magazine read only occasionally.

Specifically, in the t-commerce world, where the user input device is often a handheld TV remote controller, providing payment method information to complete a purchase transaction is even more cumbersome. The device is adapted only for entering numeric data and selecting from simple menus via navigation and function keys. Creative solutions have been devised for allowing alphanumeric input by displaying keyboard images on the TV screen, but these do not lend themselves to rapid data entry; they only make alphanumeric entry possible with patience.

SUMMARY OF THE INVENTION

Embodiments of the present invention comprise a database, the "Wallet," hosted on one or more network-connected servers, that aggregates user profile information and stores relationships between each user profile and a multiplicity of payment providers and multimedia applications with which that user has established accounts. Embodiments of the invention further comprise an extensible collection of interface adapters permitting uniform transactions between the Wallet and a multiplicity of other network-hosted applications which expose application program interfaces (APIs) permitting the exchange of information with other Internet-hosted applications such as the Wallet. Embodiments of the invention further comprise a series of methods, collectively referred to as the "TV Wallet" application, for managing a group of e-commerce/t-commerce/m-commerce related transactions, described below, whether the transactions are initiated through live, time-shifted, or on-demand programming, or other mode of the Video Display Device being used, and regardless of the type of device upon which the programming is recorded and/or played. Embodiments of the invention additionally comprise methods for propagating profile updates and other information among the multiplicity of accounts (both payment accounts and personal accounts) held by the viewer on the multiplicity of Internet-hosted applications, where permission to do so is recorded by the user in the Wallet and authorized by the applications. Embodiments of the invention further permit the viewer to initiate a transaction from a direct interface exposed by the device on which the video programming is played, and using that interface, move the transaction to an alternative web-connected device where it may be more easily or more privately concluded.

The TV Wallet application exposes a web site of its own which users may access to proactively register, create a profile, and add payment methods to their Wallet account by means well-known to one ordinarily skilled in the art. However, embodiments of the present invention apply to the user interface, methods, and systems by which the TV Wallet application manages these operations when initiated during the consumption by a viewer of video programming or other video-based activity hosted on the video display device or video delivery system using the native interface of the video player, such as an infrared remote control.

The TV Wallet application manages, aggregates, and facilitates a number of basic transactions. These transactions may be combined into a larger number of workflows according to the context in which a user interaction occurs, the requirements of the electronic medium used to initiate the transaction, the requirements of other participating Internet-hosted applications, and the user's preferences. The basic transactions include:

1. Creating a user account profile in the Wallet database;
2. Retrieving profile or authentication information from another application;
3. Defining a new payment method to complete a commercial transaction;
4. Choosing a payment method to complete a commercial transaction;
5. Pushing newly gathered information into the TV Wallet Profile;
6. Pushing newly gathered information into one or more data sources already associated with the Wallet; presuming that the data source subscribes to such updates;
7. Authenticating the user prior to permitting one or more of the other transactions; and
8. Creating linkages between the Wallet database and other payment vehicles.

The TV Wallet application may offer other features and transactions over and above this list of basic transactions. The above list of Transactions is specifically called out as the set of commercial services where Viewer input can be accelerated by embodiments of the present invention using the system and methods described.

An embodiment of the invention is the TV Wallet's ability to simply combine these transactions to provide payment flexibility and maximize user satisfaction with the interface without compromising account security. A new user may initiate the creation of a Wallet account (sign-up) in several contexts, with the workflows associated with each context comprising a distinct set of potential paths through the TV Wallet application, appropriate to the context. Typical initiating contexts for Wallet creation include:

Product or Service registration (e.g. Smart TV registration, Service Operator Registration);
Proactive sign-up using any web browser;
Sign-up prior to initiating a purchase transaction; and
Sign-up after completing a purchase transaction.

Another embodiment of the invention is the TV Wallet's ability to interact with a variety of e-commerce, t-commerce, and m-commerce applications for the ultimate purpose of associating a payment method with the transaction, in a multiplicity of ways determined by the medium of interaction, the capabilities of the application programming interfaces (APIs) exposed by the other applications, the security preferences established by the account owner, and other factors.

Yet another embodiment of the invention is the TV Wallet's ability to allow the viewer to indicate via the video device interface his desire to continue the transaction using another web-capable device, typically a computer, mobile phone, tablet, or similar device, regardless of the network medium, wireless or wired, by which the device connects to the network.

DETAILED DESCRIPTION OF THE INVENTION

Embodiments of the present invention are directed generally toward the domain of secure commercial transactions initiated in the context of television programming and carried out over a convergent network. Embodiments of the invention involve multiple user displays and input devices and multiple network protocols, and comprise multiple preferred embodiments especially with regard to the placement of automation intelligence about the host network. The following definitions are provided as an aid to understanding the subject matter and terminology thereof. Such definitions are not intended to limit the invention as set forth in the claims.

Definitions

Web-enabled Device (WD): A stored-program computer comprising at least a CPU, a memory where programs and data may be persistently stored, at least one network interface enabling the device to connect to a network and carry out two-way interactions with another Web-Enabled Device, and means for accepting input from a human being (the "User" or "Viewer") and displaying output to a human being by visual, auditory, and/or tactile means. A Smartphone, Laptop, and Tablet are all examples of WDs, but many other examples exist.

Server: A Web-enabled Device or a cluster or federation of such devices capable of hosting applications offering services (Web Services) to clients on the network to which the Server is connected.

Video Display Device (VDD): Any device or aggregation of devices capable of receiving a video transmission, optionally storing one or more video transmissions, playing video programs directly from the received transmission stream, or with a delay, or from a recording, which further contains a stored-program computer and means by which input from a human Viewer may be received, capable of conducting two-way communications with the source of the video transmission (in-band) and/or another network (out-of-band). Some but not all VDDs meet the definition of Web Enabled Device. One example of a VDD is a conventional TV receiver which has an infrared remote control and which is attached to a set-top box containing a stored-program computer and an interface to a video service operator's network such as a cable or satellite network. Another example of a Video Display Device is a Smart TV which is connected to the Internet or a private TCP/IP network, regardless of whether it is also connected to a set-top box. A third example of a Video Display Device is any Web-enabled Device hosting a stored program capable of playing video streams received over the network. Many other examples exist.

Video Program: A Video Program includes, but is not limited to, broadcast, streamed, linear or non-linear (Video on Demand or VoD) transmission or the playback of a recording of such a transmission, of video content which can comprise, by example, a TV series, an episode of a TV series, a commercial, sports series, sports program, music video, or movie. Again, many other examples exist. The Video Program further comprises video signals, audio signals, and other meta-information related to the program which may be embedded in the video stream.

Figure 1:
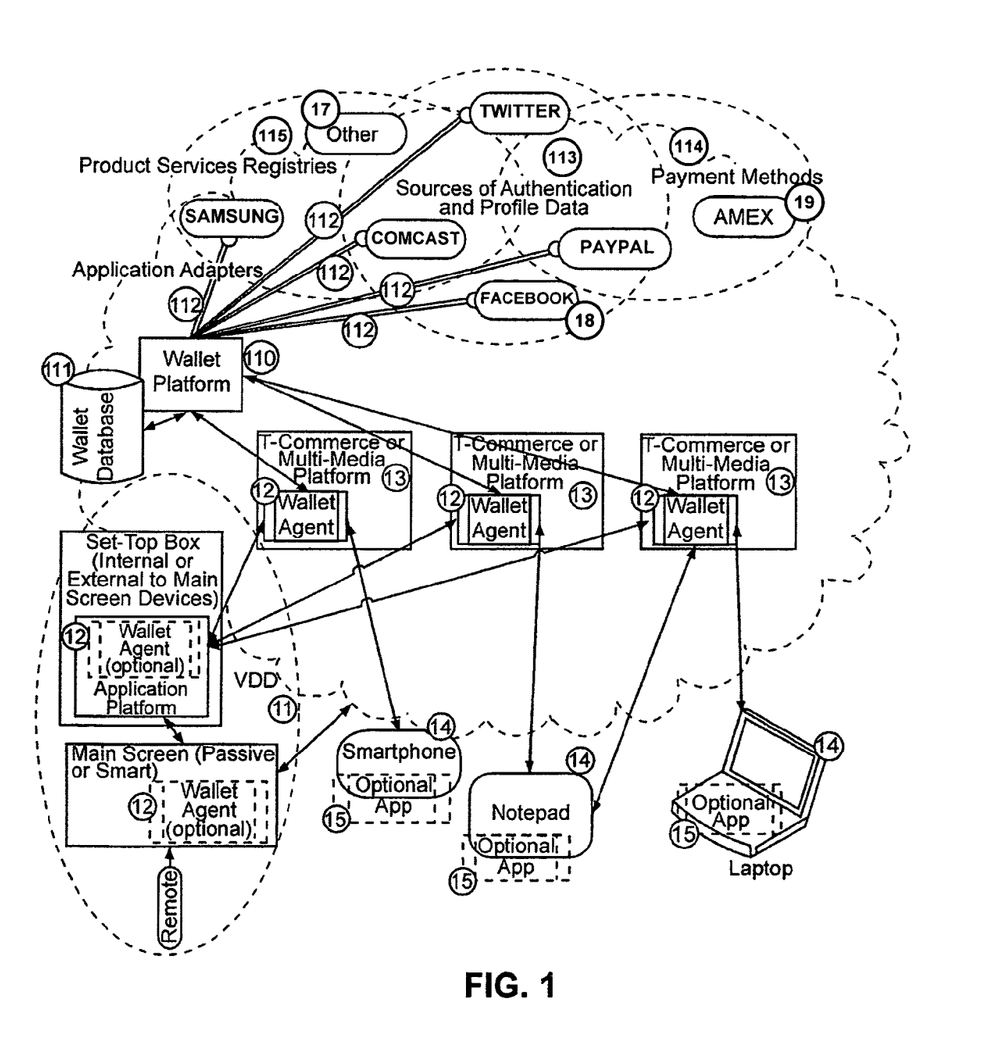
FIG. 1 illustrates a typical system for initiating commercial transactions in the context of viewing a television programming, including a typical video device capable of playing and/or recording television programming, multiple network-capable devices upon which transactions initiated during viewing may optionally be concluded, a converged network by means of which all the illustrated devices may communicate with one or more Wallet Agents, the Wallet Server, the Wallet Database, and zero or more other web applications with which the Wallet Server communicates by means of APIs.

Agent: An agent is a computer program which may reside on a multiplicity of stored program computers such as Servers, VDDs and WDs, which both acts independently and functions as a client of another application. Agents may exist in different embodiments for different host devices, and agent functions may even be divided across multiple hosts. Referring to FIG. 1, an example of dividing an agent is that some embodiments of the Wallet Agent 12 comprise a component hosted on a VDD 11 in communication with a second component hosted on a T-commerce or Multi-Media Platform 13 hosted on a Server. Other embodiments of the Wallet Agent may be entirely hosted on a Platform and communicate with the VDD using only intrinsic capabilities of the VDD via an API exposed by the VDD.

Platform: A computer software application hosted on a Server, stored persistently on storage or memory available to the Server, and executing on one or more CPUs of the Server. The term Platform may refer also to the Server and the computer software application functioning as a single entity.

Application Adapter: A software program used to intermediate between a first application, which exposes a uniform adapter interface, and a second application, which exposes a proprietary API. The first program may communicate with a multiplicity of adapters based on some addressing criterion such as the URL of the second application. The Adapter simplifies the logic of the first application by allowing it to communicate with all Adapters uniformly. The Adapters encapsulate (or hide) the differences among the second application APIs so that the first application need not be concerned with them. Typically, new Adapters can be introduced to the first application without interrupting the operation of the first or second applications.

System and Workflows

Referring again to FIG. 1, an embodiment of the system of the present invention comprises a VDD 11, at least one T-Commerce or Multi-Media Platform 13 with a Wallet Agent 12. Typically, the stored-program computer which is part of the apparatus of VDD 11 persistently stores some unique identifier for the unit, such as a manufacturer's serial number for a Smart TV or Set-top box, or a MAC address, or a static IPv6 address, or some other address which persistently and uniquely distinguishes this particular unit from all other units of the same type. Means are provided by some manufacturers and service operators on the VDD 11 for the Wallet Agent to access this unique ID, which will henceforth be referenced as the TVID. Not all VDDs expose a TVID. Where the TVID is available, it can be used as an accelerated means of authenticating the viewer. When no TVID is available, other authentication means must be provided. In some embodiments of the invention, the Wallet Agent 12 is hosted entirely on the VDD 11. In other embodiments, the Wallet Agent is hosted entirely on a Server on or in communication with the T-Commerce or Multi-Media Platform 13. In still other embodiments, components of the Wallet Agent 12 reside on both the VDD 11 and the T-Commerce or Multi-Media Platform 13. The System may further comprise one or more WDs 14, some of which may host an optional App 15 capable of communicating with at least one Wallet Agent 12. The system further comprises a Wallet Platform 110 with a Wallet Database 111. The Wallet Platform 110 may communicate with a multiplicity of other Web Applications which by means of Application Adapters 112. The other Web Applications are variously classified as Product/Service Registries 115, Authentication and Profile Data Sources 113, and Payment Methods 114. The overlapping circles 115, 113, and 114 denote how a single Web Application may belong to one, two, or all of the above classifications. Referring again to FIG. 1, the lozenge-shaped elements of the drawing represent individual Web Applications which belong to at least one of the above classifications. Application 17 (i.e., "Other") is a Product Services Registry 115 which is also a source of Authentication and Profile Data 113. Application 18 (i.e. "FACEBOOK") is only a source of Authentication and Profile Data 113. Application 19 (i.e., "AMEX") is an example of a Payment Method 114 that is neither a source of profile data 113 nor a product services registry 115.

The convergence of TCP/IP networks exemplified by the Internet with two-way video broadcast networks exemplified by cable and satellite service providers is not seamless and is in different stages of integration in different geographical regions and due to technological differences among the several video broadcast and on-demand service providers. Thus, the data path taken by an event initiated by a viewer at a VDD may travel in-band to a broadcast head-end of the service provider and from there via a TCP/IP network gateway to the T-Commerce or Multi-Media platform and the Wallet Agent. Alternately, the event may travel out-of-band, directly over a TCP/IP network from a VDD 11 to a Platform 13.

Similarly, an embodiment of the system of the present invention comprises the many existing and imaginable means by which a Viewer initiates a transaction from the VDD 11. Examples of such means are an Infrared (I/R) remote control, a touch-screen, gesture-based control, voice activated controls, physical controls on a TV receiver or set-top box, a wireless or wired game controller, and a keyboard and mouse. As long as the Viewer does not activate another WD to initiate the T-Commerce transaction but initiates the transaction by means of an interface exposed by the VDD itself, the transaction falls within the embodiment of the system of the present invention.

When the T-Commerce or Multi-Media Platform 13 receives an event from a VDD 11 indicative of a Viewer's interest in engaging in a commercial transaction, the Platform invokes the Wallet Agent 12 to manage the transaction. The event contains a variable amount of information about the context in which the event was initiated, which may include a TVID, but always includes sufficient addressing information to permit the Wallet Agent 12 to formulate and send a response to the initiating VDD 11. The information associated with the event may further comprise data about the source of the video program being consumed, such as whether the program originates from a recording, a broadcast, or an on-demand stream. The information associated with the event may further comprise program information such as the name of the series or episode being consumed and the time within the episode at which the event was initiated. The information associated with the event may further comprise data about the source of the video program being consumed, such as whether the program originates from a recording, a broadcast, a standalone application, or an on-demand stream. The information associated with the event may further comprise program information such as the name of the series or episode being consumed and the time within the episode at which the event was initiated, or context data from the application. Other types of information may also be included with the transaction.

Figure 2:
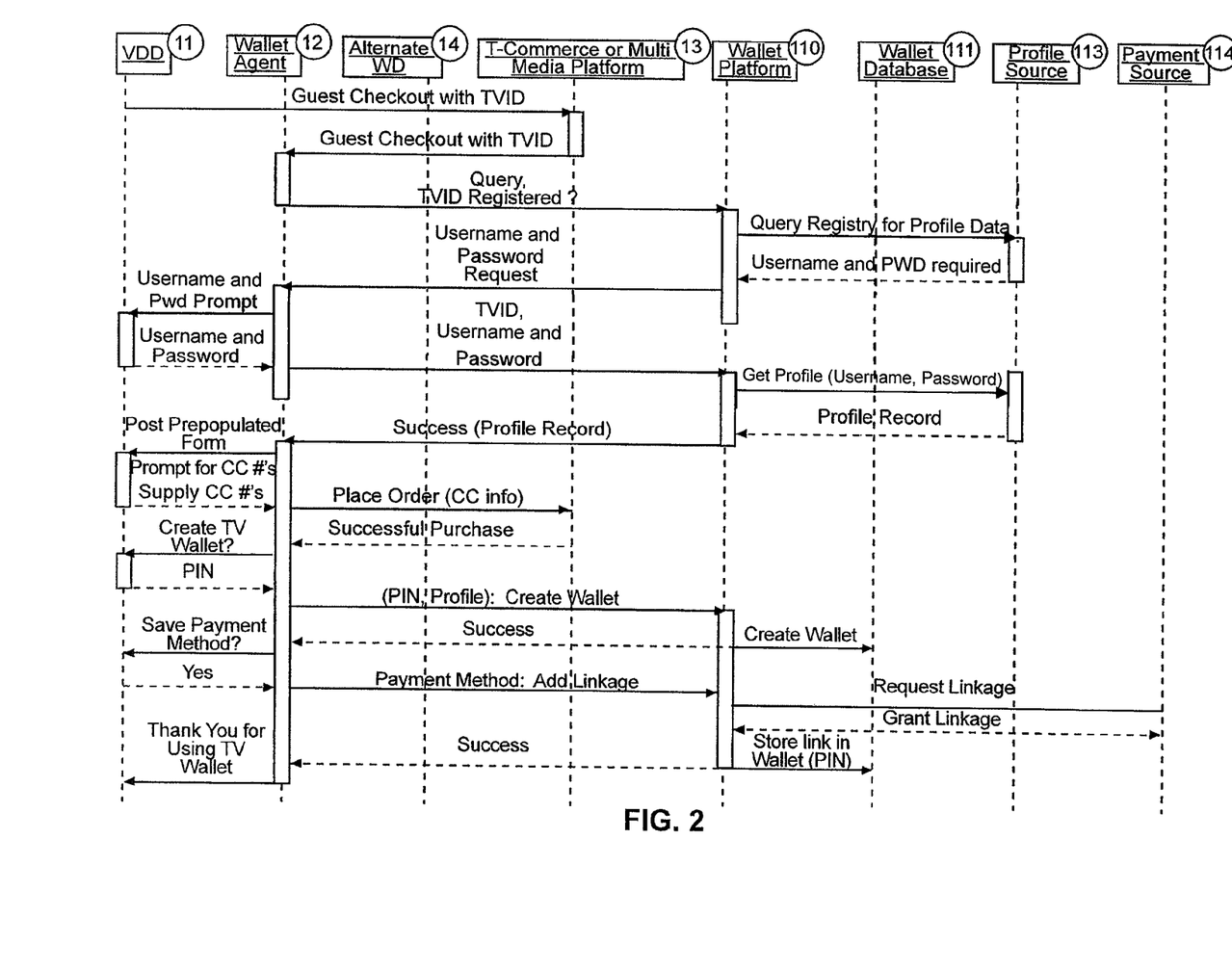
FIG. 2 illustrates the use of the TV Wallet application to create a Wallet profile and account, where the transaction is initiated and concluded from the video display device, and where some profile information is obtained from a Product or Service Registry.

Referring now to FIG. 2, which depicts a first use of the TV Wallet application, where the Viewer has previously registered with his TV service operator or VDD manufacturer and has a profile with that entity, but does not have a TV wallet profile. In a typical scenario, the Viewer has been browsing products displayed on the VDD screen, added at least one product to a virtual shopping basket or similar construct, and now initiates a purchase by sending a "checkout" event from VDD 11's viewer interface. When the Wallet Agent 12 receives the initiating event, it uses the identifying information in the event, if present, such as TVID, to query the Wallet Platform 110 to determine whether an existing Wallet Profile in the Wallet Database 111 is associated with the initiating VDD 11. Finding no Wallet Profile, but identifying the correct Registry from the TVID in the request, the Wallet Platform 110 uses the ID to query Profile Source 113 to see if a Product/Service profile has been registered for VDD endpoint 11. If a profile is found, it is next determined whether the current viewer is the owner of the profile. The Wallet Platform 110 responds to the Wallet Agent 12 by prompting the Viewer for his profile password. If the Viewer is the owner of the profile and knows the password, he provides it, and the Wallet Agent 12 forwards the password and previously established ID back to the Wallet Platform, enabling it to retrieve from Profile Source 113 alphanumeric profile information such as the Viewer's name, billing address, and phone number. An indicator that a stored payment method is present may also be provided.

Wallet Platform 110 returns the profile information to the Wallet Agent 12, which uses it to display on the VDD a partially pre-filled payment form. Because no stored payment method is available in this example, the Viewer must fill in the Credit Card Number, Expiration Date, and Security Code. At this point the Viewer might also be offered the option of moving the transaction to another device, but in the sequence of FIG. 2 this does not occur. The Viewer enters the required information and selects Place Order. Wallet Agent 12 returns the collected information to the T-Commerce Platform 13 which will complete the purchase. Platform 13 signals to the Wallet Agent 12 that the purchase was successful. Wallet Agent 12 now offers the Viewer the option of creating a TV Wallet profile to accelerate future purchases by causing the offer to be displayed on the VDD 11. If the Viewer accepts the offer (such as by pressing OK on the TV Remote) the Viewer is prompted to confirm the mobile phone number for the profile and create a numeric PIN which becomes his TV Wallet password. Wallet Agent 12 forwards the profile data and PIN to Wallet Platform 110, which creates a new Wallet Profile in the Wallet Database 111. The Wallet Profile can be identified by TVID and PIN when the Viewer initiates transactions from his home VDD 11, so that the Viewer enters only the PIN to authenticate, or by mobile phone number and PIN, which enables the Viewer to access the Wallet Profile from other devices, including VDDs belonging to other people and VDDs that do not expose a unique TVID. When the Wallet Platform 110 signals Wallet Agent 12 that the Wallet Profile has been successfully created, Wallet Agent asks the viewer whether to add the Payment Method just used to the Wallet Profile. If the Viewer authorizes this action, Wallet Agent 12 commands the Wallet Platform 110 to re-validate the payment information with the Payment Source 114. Payment Source 114 returns an approval token, proprietary to payment source 114, which the Wallet Platform 110 stores in the Wallet Database 111 along with the last 4 digits of the card number or some other nickname for the payment method (e.g. "My Gold Amex."). When the Wallet Platform reports the success of this transaction to Wallet Agent 12, the Wallet Agent causes a message thanking the Viewer for using TV Wallet to display briefly on the VDD and terminates the dialog.

Referring to the above list of basic T-commerce/multimedia transactions subject to acceleration and facilitation by the TV Wallet application, the sequence of FIG. 2 includes cases of transaction 7, Authenticating the User, Transaction 2, Retrieving profile information from another application, Transaction 3, Defining a new payment method, Transaction 1, Creating a user account profile in the Wallet Database, Transaction 5, pushing newly gathered information into the TV Wallet, and Transaction 8, creating Linkages between TV Wallet and other payment vehicles. Of these, Transactions 7, 2, 1, 5, and 8 are accelerated by the Wallet Agent's ability to aggregate and re-use information the Viewer has authorized it to access.

Figure 3:
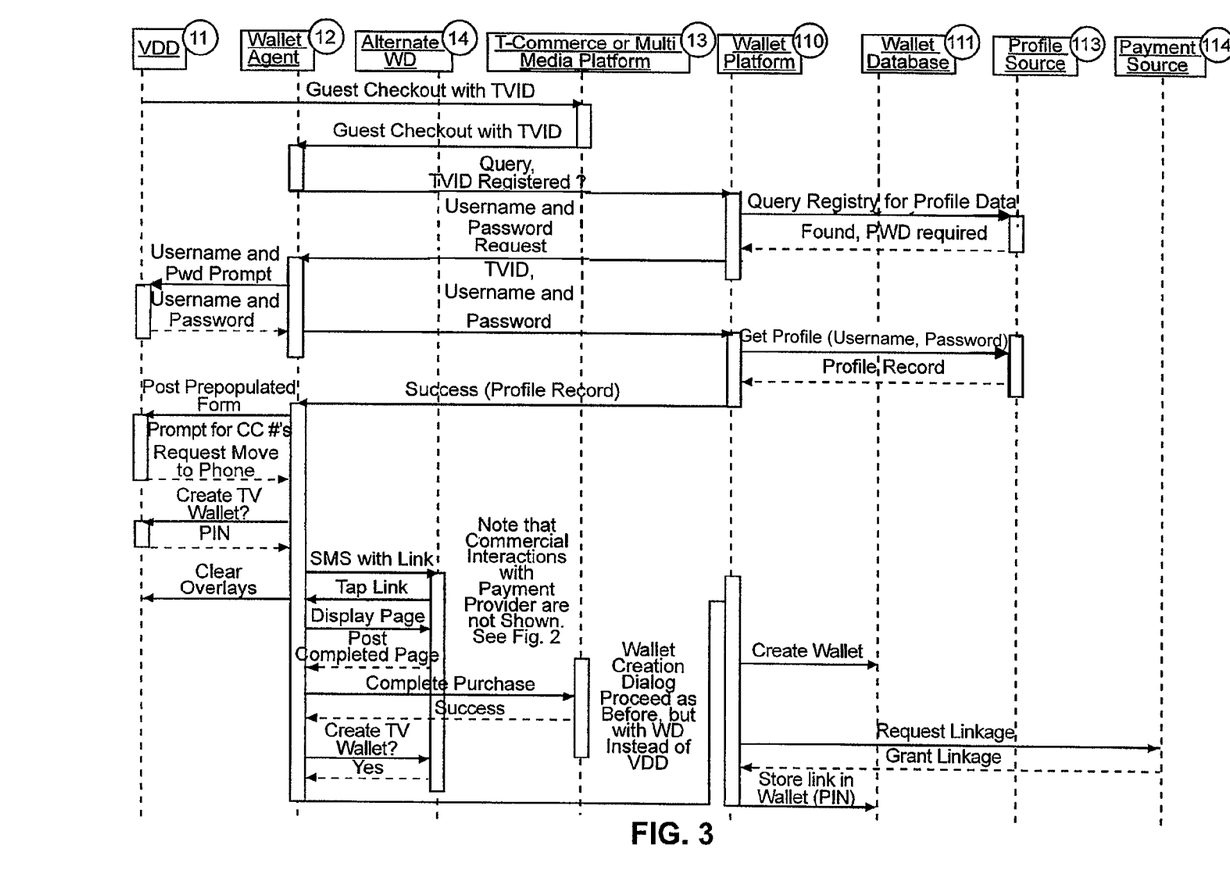
FIG. 3 illustrates the use of the TV Wallet to create a Wallet profile and account, where the transaction is initiated from the video display device but concluded on another device.

Referring now to FIG. 3, the same transaction as in FIG. 2 is described, except that in the sequence of FIG. 3, the Viewer is reluctant to enter the credit card information on the VDD screen because others are in the room. As in the sequence of FIG. 2, the Viewer has been browsing products displayed on the VDD screen, added at least one product to a virtual shopping basket or similar construct, and now initiates a purchase by sending a "checkout" event from VDD 11's viewer interface. When the Wallet Agent 12 receives the initiating event, it uses the identifying information in the event, in this case a TVID, to query the Wallet Platform 110 to determine whether an existing Wallet Profile in the Wallet Database 111 is associated with the initiating VDD 11. Finding no Wallet Profile, but identifying the correct Registry from the TVID in the request, the Wallet Platform 110 uses the ID to query Profile Source 113 to determine if a Product/Service profile has been registered for VDD endpoint 11. If a profile is found, it is next determined whether the current viewer is the owner of the profile. The Wallet Platform 110 responds to the Wallet Agent 12 by prompting the Viewer for his profile password. If the Viewer is the owner of the profile and knows the password, he provides it, and the Wallet Agent 12 forwards the password and previously established ID back to the Wallet Platform, enabling it to retrieve from Profile Source 113 alphanumeric profile information such as the Viewer's name, billing address, and phone number. An indicator whether a stored payment method is present may also be provided.

Wallet Platform 110 returns the profile information to the Wallet Agent 12, which uses it to display on the VDD a partially pre-filled payment form. Because no stored payment method is available, the Viewer must fill in the Credit Card Number, Expiration Date, and Security Code. When displaying the payment method form, the Wallet Agent 12 can display an indicator that the option of moving the transaction to another device is available. For example, overlay phone and envelope icons might be displayed, indicating that the transaction can be transferred via SMS or email. When the Viewer selects the SMS option, the Wallet Agent 12 causes the phone number from the profile to be displayed on the TV screen, prompting the Viewer to OK the use of this mobile phone or correct the number. When the Viewer confirms the telephone number, the Wallet Agent 12 constructs a mobile web form containing the profile information now displayed on the TV screen plus any known information about available payment methods, and sends an SMS text containing a URL of the form to the Viewer's confirmed mobile phone, alternate WD 14. The Viewer receives the SMS message and taps the URL to open a mobile browser and see the contextually-complete new form. The Viewer enters the required information easily and privately using the mobile phone's keyboard or touchpad, and selects Place Order. Submitting the first form from the mobile browser causes the Wallet Agent 12 to clear the transaction artifacts from the VDD 11's display. From this point on, the transaction proceeds as before, but between the Wallet Agent and the mobile phone. Wallet Agent 12 returns the collected information to the T-Commerce Platform 13 which will complete the purchase. Platform 13 signals to the Wallet Agent 12 that the purchase was successful. Wallet Agent 12 now offers the Viewer the option of creating a TV Wallet profile to accelerate future purchases by causing the offer to be displayed on the WD 14. If the Viewer accepts the offer (e.g. by tapping YES) the Viewer is prompted to confirm the mobile phone number for the profile and create a numeric PIN which becomes his TV Wallet password. Wallet Agent 12 forwards the profile data and PIN to Wallet Platform 110, which creates a new Wallet Profile in the Wallet Database 111. The Wallet Profile can be identified by (implied) TVID and PIN when the Viewer initiates transactions from his home VDD 11, or by mobile phone number and PIN, which enables the Viewer to access the Wallet Profile from other devices, including VDDs belonging to other people and VDDs not capable of providing a TVID. When the Wallet Platform 110 signals Wallet Agent 12 that the Wallet Profile has been successfully created, Wallet Agent asks the viewer whether to add the Payment Method just used to the Wallet Profile. If the Viewer authorizes this action, Wallet Agent 12 commands the Wallet Platform 110 to re-validate the payment information with the Payment Source 114. Payment Source 114 returns an approval token, proprietary to payment source 114, which the Wallet Platform 110 stores in the Wallet Database 111 along with the last 4 digits of the card number or some other nickname for the payment method (e.g. "My Gold Amex."). When the Wallet Platform 110 reports the success of this transaction to Wallet Agent 12, the Wallet Agent posts a response to the WD 14 thanking the Viewer for using TV Wallet and terminates the dialog.

While the sequence of FIG. 3 is described using a mobile phone as the alternate WD and SMS as the transfer protocol, it would be clear to one ordinarily skilled in the art that another protocol native to the WD, such as SMTP (e-mail) can be used just as easily to push the link to the new form to the alternate WD 14. The use of such protocols does not compromise the security of the transaction, because no proprietary information needs to be included in the contents of the link sent to the alternate WD, and the link can address a secure HTTPS site where the landing form requires re-entry of a password or PIN. Further, it will be clear to one ordinarily skilled in the art that rather than having the Wallet Agent 12 push the transaction to a WD as in the sequence of FIG. 3, an Optional App 15 could be installed on the WD 14 which could pull the Viewer's in-progress T-commerce transaction from the T-Commerce or Multi-Media Platform 13 and the Wallet Agent 12 using HTTPS or a proprietary secure protocol, the App 15 then continuing the transaction as described.

Figure 4:
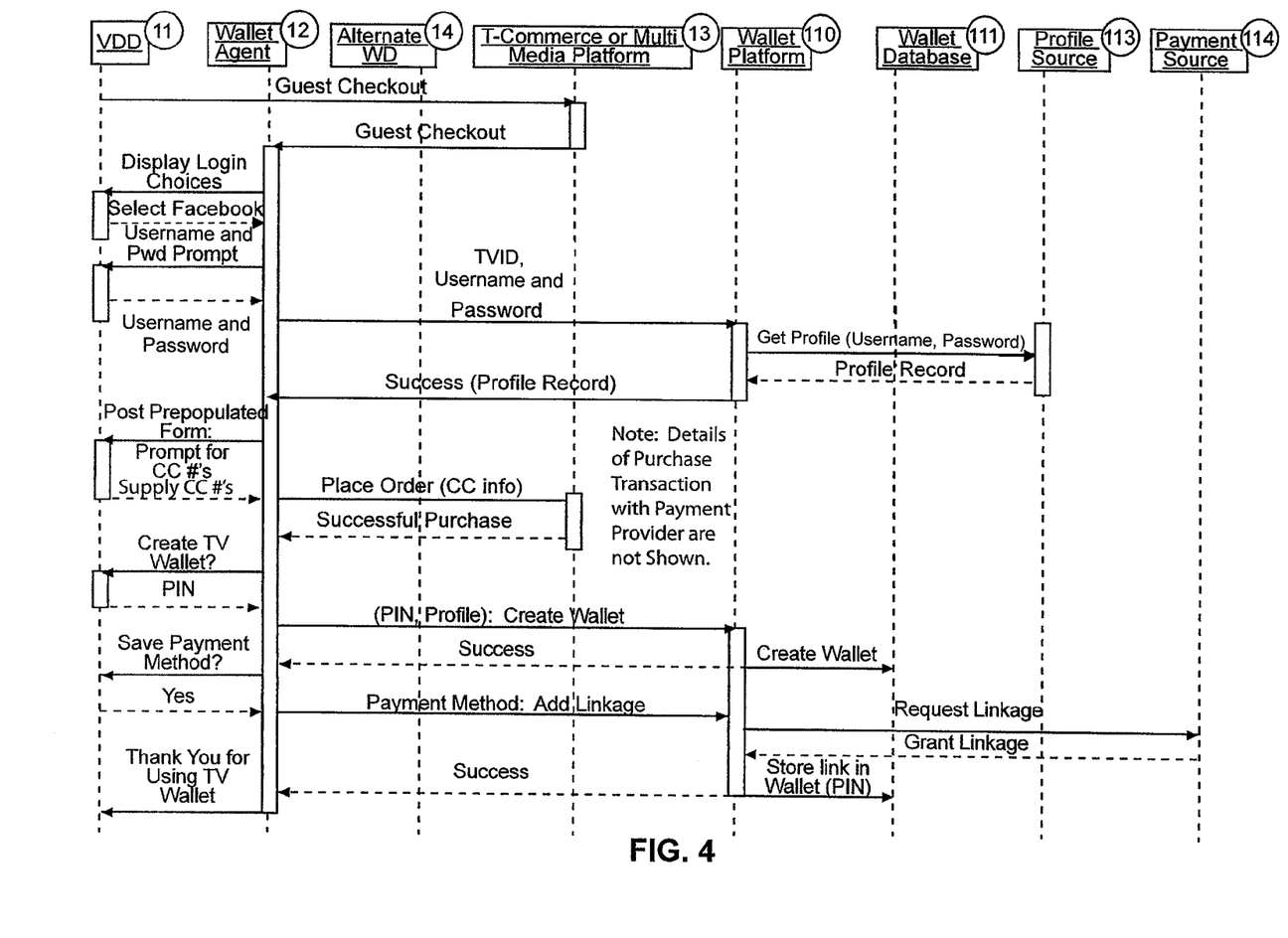
FIG. 4 illustrates a Wallet Profile Update, where the user authenticates using a profile source other than a registry, and then elects to push updated information to other profile sources.

Referring now to FIG. 4, a transaction where the initiating event does not contain a persistent TVID is described. VDD 11 transmits a "Guest Checkout" event as before, but the event does not carry any information by which the viewer can be identified. This means that unless the Viewer signs in to some profile source, the transaction cannot be completed without the Viewer entering his full name and address and payment method. When such a request is received, the TV Wallet application offers via Wallet Agent 12 several options for how to continue, including "Continue as Guest," "Create TV Wallet," and "Sign in with FACEBOOK" where "FACEBOOK" 18 is representative of one or more profile-providing social applications 113 for which the Wallet Platform 110 has Application Adapters 112. The Viewer selects "Sign in with FACEBOOK" and provides a valid (in the sequence of FIG. 4) FACEBOOK 18 username and password. Wallet Agent 12 transmits this information to Wallet Platform 110, which attempts an API login to FACEBOOK 18 via Adapter 112. The login being successful, the Wallet Platform 110 retrieves the needed profile information via the Adapter 112. Note that depending on the details of the API, the permissions the Viewer has set up with FACEBOOK 18, and other factors, the number of request/response operations required to do this may vary, as will the amount of information ultimately gathered by the Wallet Platform. When the retrieval sequence is complete, the Wallet Platform 110 returns the profile data to the Wallet Agent 12, which displays it in a pre-populated form on the VDD 11. In this example, the Viewer provides an update to the pre-populated address information via VDD 11. The Wallet Agent continues to communicate with the T-Commerce or Multi-Media Platform 13 and a Payment Method 114 to complete the purchase as before. These steps are not shown in FIG. 4 because they are the same as those of FIG. 2. When Wallet Agent 12 is notified that the purchase is complete, it posts to the VDD 11 an offer to create a TV Wallet Profile, as in FIG. 2. The Viewer responds affirmatively and creates a PIN, so Wallet Agent 12 transmits to the Wallet Platform 110 the PIN and some or all of the Payment Method and Profile information, according to the Viewer's preferences. Wallet Platform 110 creates a Wallet Profile for the Viewer, which can be accessed by a Viewer providing a correct Phone Number and Pin, or by a FACEBOOK 18 credential. Wallet Platform may additionally create a linkage to the Payment Method 114 used in the recent transaction. As a final step, the Wallet Agent queries the Viewer as to whether he wishes his FACEBOOK 18 profile to be updated with the revised address information. In answering affirmatively, the Viewer can specify whether the update is a one-time update, or whether the TV Wallet should always update FACEBOOK 18 when the TV Wallet changes. The affirmative by Viewer causes TV Wallet 12 to transmit to the Wallet Platform 110 a permission to update FACEBOOK 18, whereupon the Wallet Platform 110 pushes the update via Adapter 112 to the FACEBOOK application 18, concluding the sequence.

Figure 5:
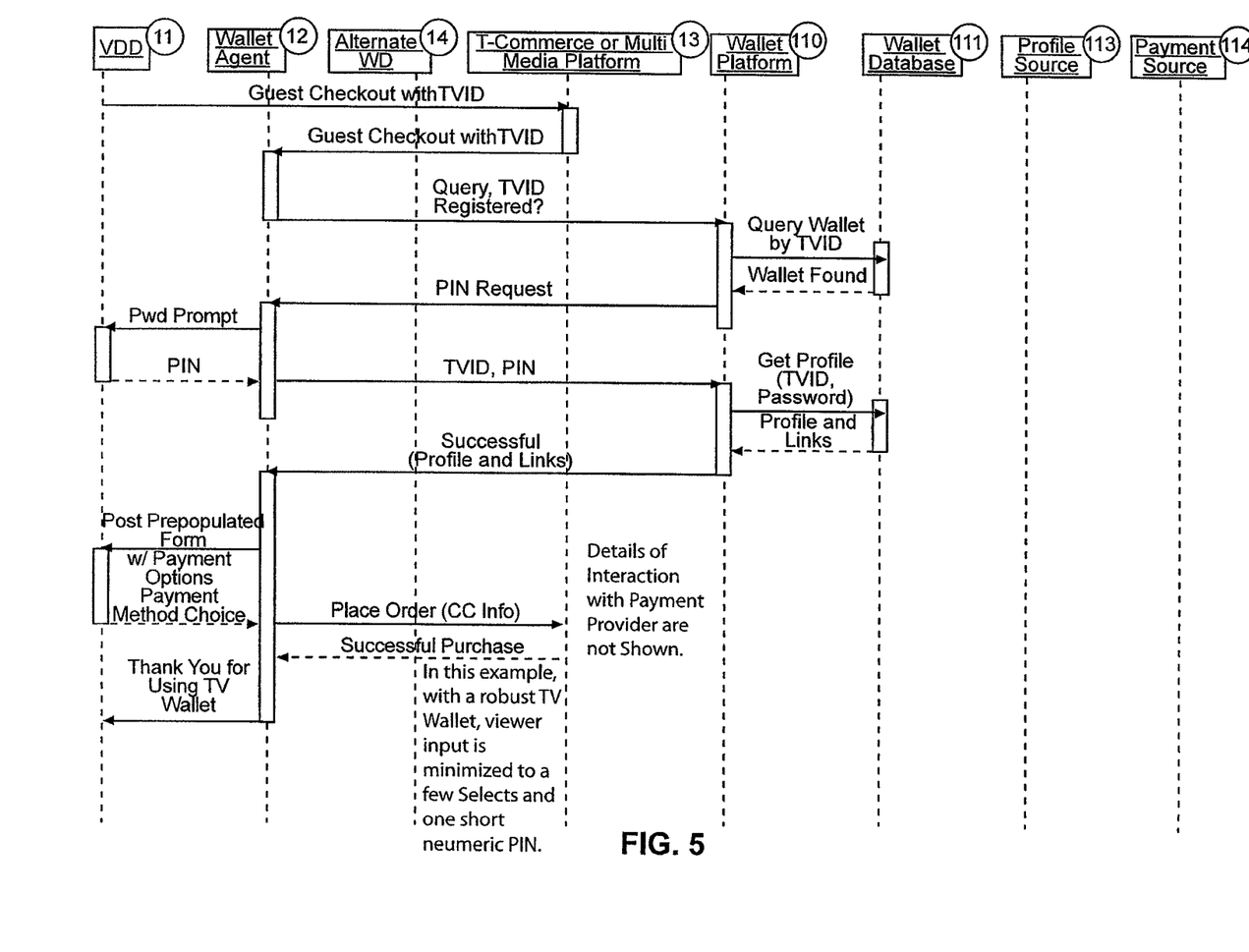
FIG. 5 illustrates an accelerated payment transaction, wherein all profile and payment method information are retrieved from the purchaser's Wallet.

FIG. 5 illustrates a purchase transaction where the Viewer has previously registered with the VDD manufacturer and created a TV Wallet containing a linkage to at least one Payment Method. As before, the sequence of FIG. 5 begins when a Viewer, having added at least one product to a virtual shopping basket or other similar mechanism which is well known to one ordinarily skilled in the art, initiates a "Checkout" event from VDD 11 containing the VDD's TVID. When Wallet Agent 12 receives the event, it forwards it to the Wallet Platform 110, which finds a Wallet Profile for VDD 11, which may or may not belong to this viewer. Wallet Platform accordingly instructs the Wallet Agent to offer the options of continuing as Guest, signing in with TV Wallet, or signing in with another source of authentication and profile data application 113 (such as FACEBOOK 18) according to the sequence of FIG. 4. In the sequence of FIG. 5, the Viewer elects to sign in with TV Wallet, providing only the needed 4 to 6-digit numeric PIN. The Wallet Agent 12 transmits the PIN to the Wallet Platform, which then retrieves the Viewer's Profile and list of stored Payment Methods from Wallet Database 111 and returns them to Wallet Agent 12. Wallet Agent 12 formats an overlay that allows the Viewer to confirm or correct billing and shipping addresses and select a payment method. If the Viewer has no corrections, he has only to select a Payment Method to complete the transaction from VDD 11. When Wallet Agent 12 receives the selection, it returns the necessary data to the T-Commerce or Multi-Media Platform 13 to complete the transaction as before. In this fully accelerated sequence, the Viewer has only had to select from a series of choices and provide a short numeric PIN. By comparison, this transaction is as brief as selecting a Video on Demand movie from one's cable provider.

It will be apparent that many other flows through the system are possible depending on the initial conditions of the transaction, the number and quality of the external profiles the Viewer owns, the Viewer's purchasing habits with respect to payment methods, and the preferences and restrictions imposed on the Wallet Platform by the Adapter APIs and on the Wallet Agent by the host T-Commerce or Multi-Media Platform. However, the methods described herein of accelerating registration, authentication, selection, and moving transactions are applicable to a broad multiplicity of such flows.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for performing a secure e-commerce transaction while accelerating user input initiated at a Video Display Device (VDD), said VDD displaying a video program provided by a video program provider, said method comprising:
   sending an e-commerce transaction request to purchase products/services from at least one product/service provider from said VDD to a T-commerce/multi-media platform in order to initiate said e-commerce transaction;
   detecting identifying information of a user in said e-commerce transaction request by said T-commerce/multi-media platform;
   querying by said T-commerce/multi-media platform a wallet database operating as part of a wallet platform in order to locate a user wallet account of said user stored in said wallet database that is associated with said identifying information detected in said e-commerce transaction request;
   failing to locate said user wallet account associated with said identifying information detected in said e-commerce transaction request by said wallet database operating as part of said wallet platform;
   querying by said wallet platform at least one external data source to locate a data profile associated with said identifying information detected in said e-commerce transaction request;
   receiving by said wallet platform from said at least one external data source acknowledgement that a data profile associated with said identifying information detected in said e-commerce transaction request has been located;
   sending a user authentication request from said wallet platform to said T-commerce/multi-media platform;
   sending said user authentication request from said T-commerce/multi-media platform to said VDD;
   receiving user authentication information from said VDD by said T-commerce/multi-media platform;
   retrieving securely with said user authentication information by said wallet platform from said at least one external data source said data profile information as user account information including external authentication, profile, and/or payment source/method information associated with said user from said at least one external data source such that said user does not have to enter said retrieved external authentication, profile, and/or payment source/method information at said VDD and said user exclusively communicates with said T-commerce/multi-media platform so as to preclude said user from a need to communicate directly with said at least one external data source directly, said at least one external data source being at least one Internet connected application that is external to and separate from said video program provider;
   sending by said wallet platform said user account information of said user to said T-commerce/multi-media platform;
   populating by said T-commerce/multi-media platform an e-commerce transaction form using said user account information;

sending said e-commerce transaction form from said T-commerce/multi-media platform to said VDD;

displaying said e-commerce transaction form to said user by said VDD;

obtaining payment and shipping selections from said user by said VDD based on said e-commerce transaction form displayed to said user by said VDD;

sending said payment and shipping selections of said user from said VDD to said T-commerce/multi-media platform;

performing product ordering transactions by said T-commerce/multi-media platform with said at least one product service provider as defined in said e-commerce transaction request through an application adapter connection of said wallet platform to said at least one product/service provider; and performing payment transactions by said T-commerce/multi-media platform with said user selected payment selection and with payment data as defined in said e-commerce transaction request through an application adapter connection of said wallet platform to said user selected payment selection.

2. The method of claim 1 wherein said process of sending said e-commerce transaction request to purchase products/services from said at least one product/service provider from said VDD to said T-commerce/multi-media platform in order to initiate said e-commerce transaction further comprises:

including by said VDD a unique identification number of said VDD, referred to herein as a TVID, in said e-commerce transaction request as said identifying information of said user.

3. The method of claim 1 wherein said process of sending said e-commerce transaction request to purchase products/services from said at least one product/service provider from said VDD to said T-commerce/multi-media platform in order to initiate said e-commerce transaction further comprises:

obtaining by said VDD a unique identification value of said user from said user;

including by said VDD said unique identification value of said user in said e-commerce transaction request as said identifying information of said user.

4. The method of claim 1 further comprising:

creating by said wallet platform a user wallet account in said wallet database based on said user account information including said external authentication, profile, and payment source/method information for said user obtained from said at least one external data source such that said user does not have to enter said retrieved external authentication, profile, and/or payment source/method information at said VDD.

5. The method of claim 4 further comprising:

sending an add payment method request from said VDD to said T-commerce/multi-media platform;

sending a prompt for new payment method information from said T-commerce/multi-media platform to said VDD;

obtaining said new payment method information by said VDD from said user;

sending said new payment method information from said VDD to said T-commerce/multi-media platform;

sending from said T-commerce/multi-media platform said new payment method information to said wallet database operating as part of said wallet platform;

authenticating said new payment method information with a payment source identified in said new payment method information by said wallet platform through an application adapter connection to said payment source identified in said new payment method information; and updating by said wallet database operating as part of said wallet platform said user wallet account with said new payment method information when said new payment method information has been authenticated by said payment source identified in said new payment method information.

6. The method of claim 4 further comprising:

sending an add payment method request from said VDD to said T-commerce/multi-media platform;

sending a prompt for new payment method information from said T-commerce/multi-media platform to said VDD;

sending a move to new device request from said VDD to said T-commerce/multi-media platform;

pushing by said T-commerce/multi-media platform new payment method data entry to a different web-enabled device identified in said move to new device request such that said add payment method transaction is initiated on said different web-enabled device by said T-commerce/multi-media platform and not by said user;

obtaining said new payment method information by said different web-enabled device from said user;

sending said new payment method information from said different web-enabled device to said T-commerce/multi-media platform;

sending from said T-commerce/multi-media platform said new payment method information to said wallet database operating as part of said wallet platform;

authenticating said new payment method information with a payment source identified in said new payment method information by said wallet platform through an application adapter connection to said payment source identified in said new payment method information; and updating by said wallet database operating as part of said wallet platform said user wallet account with said new payment method information when said new payment method information has been authenticated by said payment source identified in said new payment method information.

7. The method of claim 6 wherein said pushing by said T-commerce/multi-media platform new payment method data entry to said different web-enabled device identified in said move to new device request utilizes SMS protocols.

8. The method of claim 6 wherein said pushing by said T-commerce/multi-media platform new payment method data entry to said different web-enabled device identified in said move to new device request utilizes email protocols.

9. The method of claim 1 wherein said communication between said VDD and said T-commerce/multi-media platform is one of a group consisting of: a direct out-of-band TCP/IP (Transmission Control Protocol/Internet Protocol) communication connection between said VDD and said T-commerce/multi-media platform, and an in-band communication connection to a broadcast head-end of said video program provider with an additional TCP/IP communication connection from said head-end of said video program provider to said T-commerce/multi-media platform.

10. The method of claim 1 further comprising updating said at least one external data source with information obtained from said user via said VDD.

11. The method of claim 1 further comprising updating said at least one external data source with information obtained from at least a second external data source.

* * * * *